(12) United States Patent
Peltier et al.

(10) Patent No.: US 12,735,093 B2
(45) Date of Patent: Sep. 15, 2026

(54) METHOD FOR CONTROLLING AN ASSISTANCE MOTOR OF A POWER STEERING SYSTEM COMPRISING AN ALGORITHM FOR COMPENSATING THE OSCILLATIONS OF A STEERING WHEEL LINKED TO THE PRESENCE OF AN IMBALANCE

(71) Applicant: JTEKT EUROPE, Irigny (FR)

(72) Inventors: Hervé Peltier, Saint Maurice sur Dargoire (FR); Christophe Gauthier, Chasse sur Rhône (FR)

(73) Assignee: JTEKT EUROPE, Irigny (FR)

( * ) Notice: Subject to any disclaimer, the term of this patent is extended or adjusted under 35 U.S.C. 154(b) by 594 days.

(21) Appl. No.: 17/778,944

(22) PCT Filed: Nov. 26, 2020

(86) PCT No.: PCT/FR2020/052201

§ 371 (c)(1),
(2) Date: May 23, 2022

(87) PCT Pub. No.: WO2021/105632

PCT Pub. Date: Jun. 3, 2021

(65) Prior Publication Data

US 2023/0009686 A1 Jan. 12, 2023

(30) Foreign Application Priority Data

Nov. 29, 2019 (FR) ..................................... 19/13482

(51) Int. Cl.
*B62D 5/04* (2006.01)

(52) U.S. Cl.
CPC ......... *B62D 5/0472* (2013.01); *B62D 5/0463* (2013.01)

(58) Field of Classification Search
None
See application file for complete search history.

(56) References Cited

U.S. PATENT DOCUMENTS 6,161,068 A 12/2000 Kurishige et al.
7,379,802 B2 5/2008 Kasbarian et al.
(Continued)

FOREIGN PATENT DOCUMENTS

JP 2002362394 A * 12/2002
JP 2005-530645 A 10/2005
(Continued)

OTHER PUBLICATIONS

English translation of JP2002362394A's Description (Year: 2002).*
Mar. 5, 2021 International Search Report issued in International Patent Application No. PCT/FR2020/052201.

*Primary Examiner* — Adam D Tissot
*Assistant Examiner* — Laura E Linhardt
(74) *Attorney, Agent, or Firm* — Oliff PLC

(57) ABSTRACT

A method controls a power steering motor of a power steering system. The power steering system includes at least one steering wheel configured to receive a steering torque applied by a driver, the power steering motor being configured to apply a motor torque to a rack, at least one wheel connected to the rack, and at least one steering computer implementing a main control algorithm. The main control algorithm includes a step of determining a main engine torque according to at least the steering wheel torque, characterised in that the steering computer also includes an algorithm for compensating for an oscillation of the steering wheel implementing a step of determining a compensating engine torque such that the steering wheel torque is equal to a reference steering wheel torque.

7 Claims, 5 Drawing Sheets

(56) References Cited

U.S. PATENT DOCUMENTS

| | | | | |
|---|---|---|---|---|
| 10,112,643 | B2 | 10/2018 | Gotou et al. | |
| 2006/0241790 | A1* | 10/2006 | Chen | B62D 5/046 700/66 |
| 2012/0061169 | A1* | 3/2012 | Oblizajek | B62D 5/0472 180/446 |
| 2013/0124048 | A1 | 5/2013 | Gruener et al. | |
| 2016/0129935 | A1* | 5/2016 | Akatsuka | B62D 6/002 180/446 |
| 2018/0065661 | A1 | 3/2018 | Kim | |
| 2018/0118253 | A1* | 5/2018 | Minamiguchi | B62D 5/0472 |
| 2018/0134309 | A1* | 5/2018 | Moulaire | B62D 5/0463 |
| 2019/0061809 | A1 | 2/2019 | Weiefors | |
| 2019/0315392 | A1* | 10/2019 | Moulaire | B62D 5/0463 |

FOREIGN PATENT DOCUMENTS

| | | |
|---|---|---|
| JP | 2013-032086 A | 2/2013 |
| JP | 2015-145215 A | 8/2015 |

* cited by examiner 63
62
61
T3ref
ΔT3
64
ΔT3f
65
T12C
G
T3 a) b)

T3 T(s) 14,5 Hz T3 F(Hz)

METHOD FOR CONTROLLING AN ASSISTANCE MOTOR OF A POWER STEERING SYSTEM COMPRISING AN ALGORITHM FOR COMPENSATING THE OSCILLATIONS OF A STEERING WHEEL LINKED TO THE PRESENCE OF AN IMBALANCE

The invention concerns the field of power steering systems of a vehicle and more particularly a method for controlling an assistance motor.

The object of a vehicle steering system is to enable a driver to control a trajectory of the vehicle by exerting force on a steering wheel.

Generally, a steering system comprises several elements including said steering wheel connected to a steering column, a rack, and two wheels each connected to a tie-rod. The rack is the part connecting the steering wheel, via the steering column, to the wheels, via the tie-rods; that is to say the rack transforms the forces exerted by the driver on the steering wheel into a lateral rotation of the wheels of the vehicle, that is to say a right/left rotation with respect to the vehicle.

An electric power steering system of a vehicle uses an assistance motor, driven by a main control algorithm implanted in a steering computer, to reduce the effort required by the driver on the steering wheel to laterally rotate the wheels of the vehicle. Depending on the forces exerted on the steering wheel, that is to say the steering wheel torque, the assistance motor exerts an assistance force, that is to say a motor torque, on the rack so as to turn the wheels in a lateral rotation. A motor torque value is determined by the main control algorithm.

The wheels of the vehicle also rotate along their axes of rotation in order to move the vehicle forward or backward.

This rotation can be unbalanced. An imbalance on the wheel is then present. An imbalance is for example linked to a loss of wheel balancing weight, a veiled braking disc, in this case the imbalance only appears when braking, or a fault on a tire of wheel.

When the vehicle is moving, an imbalance exerts a translational force applied sinusoidally on the rack. In other words, the imbalance creates a translational movement of the rack. The rack being connected to the steering wheel, the translational movement of the rack generates an oscillation movement of the steering wheel.

An amplitude of the steering wheel oscillation is directly related to an imbalance size. The amplitude can be measured by means of the steering wheel torque. A frequency of the steering wheel oscillation is related to a vehicle speed. More precisely, the oscillation frequency of the steering wheel increases with the speed of the vehicle. The oscillation frequency can also be determined by means of the steering wheel torque.

Thus, when the speed of the vehicle is comprised between 90 km/h and 140 km/h, the oscillation frequency is comprised between 11 Hz and 18 Hz and the imbalance causes, at these frequencies, a resonance of the steering system which makes the oscillation of the steering wheel to the driver. A feeling of driving is then degraded.

A test was carried out in order to characterize the steering wheel oscillation phenomenon. During the test, a vehicle equipped with an imbalance carried out a displacement at approximately 110 km/h during approximately 30 s. FIG. 1 illustrates the amplitude A of the oscillation of the steering wheel of the vehicle on a diagram representing the time T as a function of the frequency F. FIG. 1 presents a substantially vertical line R corresponding to a strong amplitude A of oscillation at 14.5 Hz in particular between 15 and 19 s.

There is a known solution which makes it possible to reduce the amplitude of the oscillation of the steering wheel by integrating, into the main control algorithm of the computer, an amplification of the motor torque at the oscillation frequency.

In other words, thanks to the steering wheel torque, it is possible to determine the frequency, comprised between 11 Hz and 18 Hz, of oscillation of the steering wheel linked to the imbalance. Moreover, the main control algorithm permanently determines the motor torque to be applied by the assistance motor to the rack. The solution increases said motor torque at the oscillation frequency so as to counter the movement of the rack induced by the imbalance, that is to say at said frequency, the assistance motor applies to the rack a movement inverse to the movement induced by the imbalance. In this way, the movement of the rack linked to the imbalance is reduced and therefore the amplitude of the oscillation of the steering wheel is reduced.

A test similar to that of FIG. 1 was carried out by activating a solution as described above. It is represented in FIG. 2 which illustrates the amplitude A of the oscillation of the steering wheel of the vehicle on a diagram representing the time T according to the frequency F. FIG. 2 also has a substantially vertical line R' corresponding to an oscillation amplitude A at 14.5 Hz. The amplitude A of oscillation is lower than in the first test, that is to say FIG. 1, but remains clearly sensitive.

Thus, the above solution decreases the oscillation of the steering wheel without nonetheless ensuring its complete removal.

Furthermore, since the solution is integrated in series with the main control algorithm, the solution only intervenes after the main control algorithm. In other words, the main control algorithm determines a motor torque and the solution modifies this motor torque according to certain condition(s). Thus, there is a risk of destabilizing proper operation of the main control algorithm.

The object of the invention is to remedy all or part of the aforementioned drawbacks by proposing a solution making it possible to suppress the amplitude of the oscillation of the steering wheel associated with an imbalance while guaranteeing stability of the main control algorithm.

The object of the invention is a method for controlling an assistance motor of a power steering system, said power steering system comprising at least one steering wheel configured to receive a steering wheel torque applied by a driver, the assistance motor configured to apply a motor torque to a rack, at least one wheel connected to said rack, and at least one steering computer implementing a main control algorithm, the main control algorithm comprising a step of determining a main motor torque as a function of at least the steering wheel torque, characterized in that the steering computer also comprises an algorithm for compensating for an oscillation of the steering wheel implementing a step of determining a compensation motor torque so that the steering wheel torque is equal to a reference steering wheel torque.

In the presence of an imbalance causing the steering wheel to oscillate, the compensation algorithm determines a compensation motor torque which is applied by the assistance motor to the rack. The compensation motor torque opposes the torque induced by the imbalance so as to suppress the latter, and therefore so as to suppress the oscillation of the steering wheel.

The compensation algorithm is a closed loop regulation. Indeed, the compensation algorithm integrates a reaction of the power steering system by taking into account the steering wheel torque. More precisely, the compensation algorithm determines the compensation motor torque as long as the steering wheel torque is not equal to the reference steering wheel torque.

Thus, the compensation algorithm controls the amplitude of the steering wheel oscillations by imposing that the steering wheel torque be equal to the reference steering wheel torque.

Furthermore, the compensation algorithm determines the compensation motor torque independently of the main control algorithm. Indeed, the compensation algorithm uses the steering wheel torque as input and not a datum calculated by the main control algorithm such as the main motor torque.

Thus, there is no interference between the main control algorithm and the compensation algorithm. The compensation algorithm takes into account the main control algorithm to ensure stability of the steering system.

The compensation algorithm works in parallel with the main control algorithm.

Thus, it is possible to install the compensation algorithm on any vehicle operating with any main control algorithm.

According to one characteristic of the invention, the method comprises a summation step in which the compensation motor torque is added to the main motor torque so as to determine the motor torque.

In other words, the motor torque is equal to the sum of the main motor torque and the compensation motor torque.

The compensation motor torque does not replace the main motor torque.

There is indeed a simultaneous operation of the compensation algorithm and of the main control algorithm. The compensation motor torque is superimposed on the main motor torque.

Thus, there is a parallel operation of the two algorithms.

According to one characteristic of the invention, the reference steering wheel torque is a variable value as a function of at least one parameter.

According to one characteristic of the invention, the reference steering wheel torque is a fixed value.

According to one characteristic of the invention, the reference steering wheel torque is equal to 0 Nm. Thus, the compensation algorithm seeks that the steering wheel torque is equal to 0 Nm for the frequencies of the oscillations associated with the imbalance, while not altering the other frequencies, that is to say those located in a zone of driving pleasure. In other words, the compensation algorithm cancels the amplitude of the steering wheel oscillations. The compensation algorithm makes it possible to eliminate any sensation of steering wheel oscillation linked to an imbalance. Driving comfort is therefore guaranteed.

According to one characteristic of the invention, the step of determining a compensation motor torque comprises a phase of filtering low frequencies by means of a high-pass filter.

A high pass filter passes high frequencies of an input signal.

In the present case, the high-pass filter receives the steering wheel torque as input. Thus, only the high frequencies of the steering wheel torque are processed by the compensation algorithm.

In this way, it is possible to differentiate the steering wheel torque associated with the presence of an imbalance and which causes an undesired oscillation, from a steering wheel torque normally applied by the driver.

Since the compensation algorithm is applied only to the high frequencies of the steering wheel torque, there is no interference between the compensation algorithm and the main control algorithm.

According to one characteristic of the invention, the high-pass filter has a cut-off frequency of 10 Hz.

Experience shows that an imbalance detectable by the driver at the level of the steering wheel causes the steering wheel to oscillate between 10 Hz and 20 Hz.

Thus, the high-pass filter is matched to the steering wheel oscillation frequencies.

According to one characteristic of the invention, the step of determining a compensation motor torque comprises a phase of calculating a steering wheel torque error by subtracting the reference steering wheel torque and the steering wheel torque.

The steering wheel torque error corresponds to the difference between the steering wheel torque and the reference steering wheel torque. This is therefore the difference that must be absorbed by the compensation algorithm. When the steering wheel torque error is zero, there is no steering wheel oscillation.

According to one characteristic of the invention, the step of determining a compensation motor torque comprises a compensation phase in which a controller determines the compensation motor torque as a function of the steering wheel torque error. The controller performs the compensation phase so as to determine a compensation motor torque which makes it possible to cancel the steering wheel torque error. The controller comprises a plurality of parameters, whose at least one depends on a frequency of the steering wheel oscillations.

Thus, the controller can be adapted to the different frequencies of oscillation of the steering wheel. According to one characteristic of the invention, an operating frequency of the compensation algorithm can be selected independently of an operating frequency of the main control algorithm.

The frequency of operation corresponds to the number of calls of the compensation algorithm in one second.

Since the compensation algorithm is independent of the main control algorithm, their operating frequencies can be independent.

Generally, the frequency of the main control algorithm is around 1 kHz. The operating frequency of the compensation algorithm can thus be selected so as to limit a load on the steering computer.

According to one characteristic of the invention, the operating frequency of the compensation algorithm is less than 200 Hz.

Thus, the compensation algorithm is capable of processing a physical phenomenon whose frequency is less than 100 Hz. The frequency of oscillation of the steering wheel linked to an imbalance being comprised between 10 Hz and 20 Hz, an operating frequency of the compensation algorithm of less than 200 Hz makes it perfectly possible to detect the phenomenon.

The invention also relates to a vehicle implementing a method according to the invention.

The invention will be better understood, thanks to the description below, which relates to an embodiment according to the present invention, given by way of non-limiting example and explained with reference to the appended diagrammatic drawings, in which.

The invention concerns a method 10 for controlling an assistance motor 12 of a power steering system 1 of a vehicle 2, and more particularly of a motor vehicle 2 intended for the transport of persons.

Figure 9:
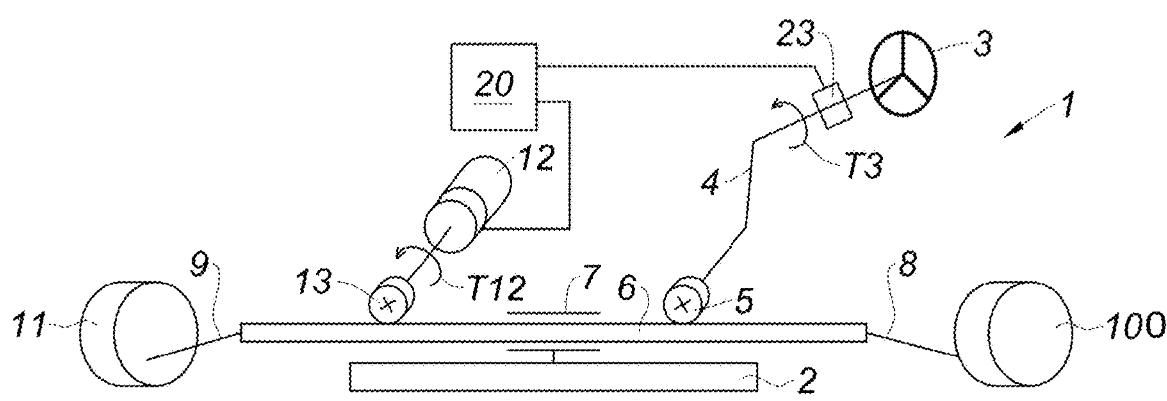
FIG. 9 is a schematic representation of a power steering system.

In a manner known per se, and as can be seen in FIG. 9, said power steering system 1 comprises a steering wheel 3 which allows a driver to manoeuvre said power steering system 1 by exerting a force, called «steering torque» T3, on said steering wheel 3.

Said steering wheel 3 is preferably mounted on a steering column 4, guided in rotation on the vehicle 2, and which meshes, by means of a steering pinion 5, on a rack 6, which is itself guided in translation in a steering casing 7 fixed to said vehicle 2.

Preferably, the ends of said rack 6 are each connected to a connection tie-rod 8, 9 connected to the steering knuckle of a wheel 100, 11 (respectively a left wheel 100 and a right wheel 11), so that the longitudinal displacement in translation of the rack 6 makes it possible to carry out a lateral rotation and therefore to modify the steering angle (yaw angle) of the wheels 100, 11.

The wheels 100, 11 can moreover preferably also be driving wheels.

The power steering system 1 also comprises the assistance motor 12 intended to supply an assistance force T12, and more particularly a motor torque T12, to assist the operation of said power steering system 1.

The assistance motor 12 will preferably be an electric motor, with two directions of operation, and preferably a rotary electric motor, of the brushless type. The assistance motor 12 can come into engagement, if necessary via a reducer of the gear reducer type, or on the steering column 4 itself, to form a so-called «single pinion» mechanism, either directly on the rack 6, for example by means of a second pinion 13 separate from the steering pinion 5 which allows the steering column 4 to mesh with the rack 6, so as to form a so-called «double pinion» mechanism, as illustrated in FIG. 9, or even by means of a ball screw which cooperates with a corresponding thread of said rack 6, at a distance from said steering pinion 5.

The power steering system 1 also comprises a steering computer 20 which receives information from a steering wheel torque T3 sensor 23 and transmits to the assistance motor 12 the motor torque T12 to be applied.

Figures 3, 4:
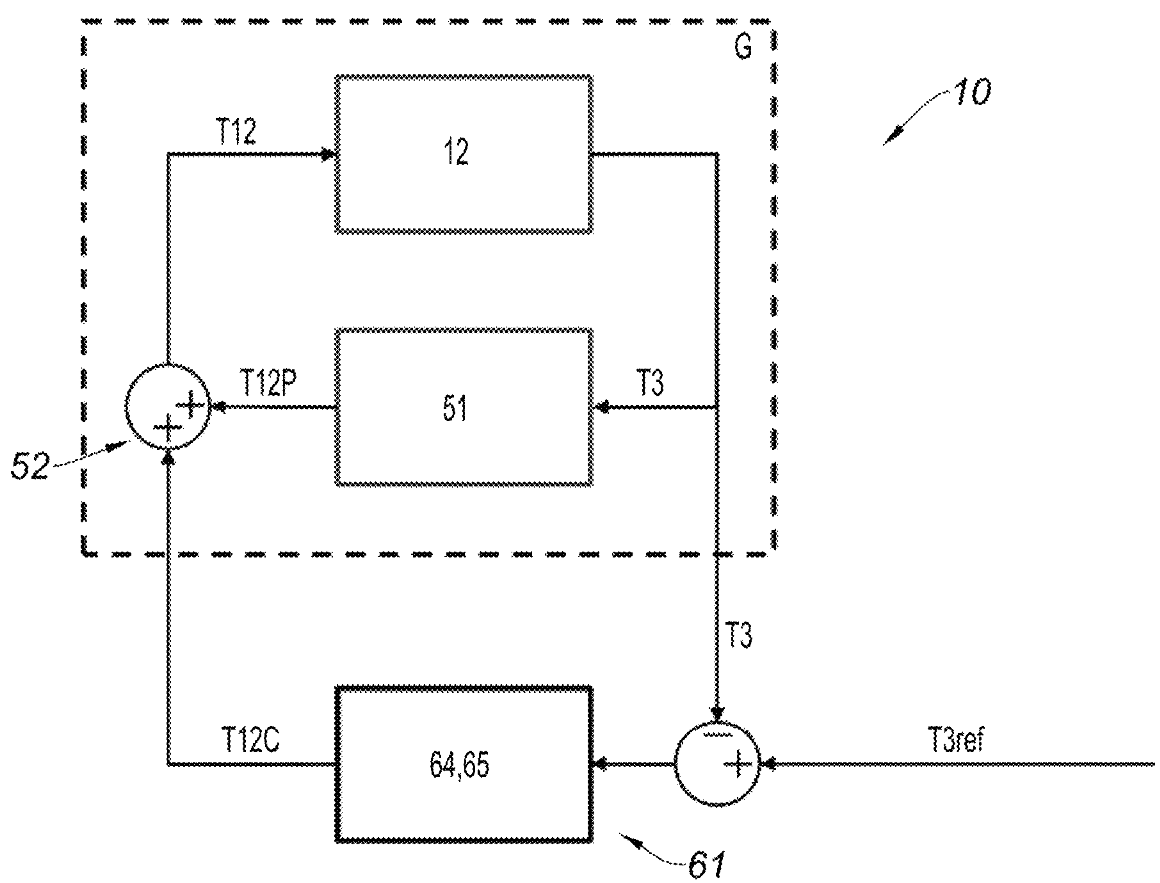
FIG. 3 is a schematic representation of a method according to the invention.
FIG. 4 is a representation of a detail of FIG. 3.

FIG. 3 represents a method 10 for controlling the assistance motor 12 carried out by the steering computer 20 which implements a main control algorithm 51 and a compensation algorithm 61.

The main control algorithm 51 comprises a step of determining a main motor torque T12P as a function of the steering wheel torque T3. The main control algorithm 51 therefore receives the steering wheel torque T3 as input and determines the main motor torque T12P. The main control algorithm 51 comprises a plurality of functions allowing, for example, a detection of good maintenance of the steering wheel 3 by the driver, or even a detection of an oversteer or an understeer. The purpose of the main motor torque T12P is to reduce the force required by the driver to turn the steering wheel 3. In other words, the main motor torque T12P reduces the steering wheel torque T3 exerted by the driver on the steering wheel 3.

The object of the compensation algorithm 61 for an oscillation of the steering wheel 3 is to reduce an oscillation induced in the steering wheel 3 by an imbalance present on a wheel 100, 11.

The compensation algorithm 61 is more precisely represented in FIG. 4. The compensation algorithm 61 implements a step 62 of determining a compensation motor torque T12C so that the steering wheel torque T3 is equal to a reference steering wheel torque$T3_{ref}$. In other words, the compensation algorithm 61 receives the steering wheel torque T3 as input and the reference steering wheel torque $T3_{ref}$ and determines the compensation motor torque T12C.

For this, the step 62 of determining a compensation motor torque T12C comprises a phase 63 of calculating a steering wheel torque error ΔT3 by subtracting the reference steering wheel torque $T3_{ref}$ and the steering wheel torque T3. The reference steering wheel torque $T3_{ref}$ is selected equal to 0 Nm so as to completely suppress the amplitude A of oscillation of the steering wheel 3. Indeed, the reference motor torque $T3_{ref}$ is the value at which the method imposes the steering wheel torque T3.

Furthermore, the step 62 of determining a compensation motor torque T12C comprises a phase 64 of filtering the low frequencies by means of a high-pass filter. The filtering step 64 receives the steering wheel torque error ΔT3 as input and determines a filtered steering wheel torque error ΔT3*f*. The high pass filter has a cut-off frequency of 10 Hz. In other words, only frequencies of the steering wheel torque error ΔT3 greater than 10 Hz pass to the next phase. Thus, the compensation algorithm 61 is only applied to the frequencies of the steering wheel torque T3 greater than 10 Hz, and therefore only to the oscillations of the steering wheel 3 associated with the imbalance.

The step 62 of determining a compensation motor torque T12C finally comprises a compensation phase 65 in which a controller determines the compensation motor torque T12C as a function of the filtered steering wheel torque error ΔT3*f*. The controller is parameterized with a plurality of parameters selected judiciously so that the compensation algorithm 61 is robust and stable.

The compensation algorithm 61 is positioned in parallel with the main control algorithm 51. Thus, an operating frequency of the compensation algorithm 61 can be selected independently of an operating frequency of the main control algorithm 51 The operating frequency of the compensation algorithm 61 is less than 100 Hz.

The compensation algorithm 61 is a regulation of the steering wheel torque T3 in closed loop. Indeed, in the method 10 according to the invention, it can be considered that the compensation algorithm 61 is applied to a general system G comprising the main control algorithm 51 and the assistance motor 21. A reaction of the general system G is compared with a reference value so as to correct the compensation algorithm 61.

The method also comprises a summation step 52 in which the compensation motor torque T12C is added to the main motor torque T12P so as to determine the motor torque T12. Thus, the motor torque T12 comprises a part linked to the main control algorithm 51 and a part linked to the compensation algorithm 61.

Figure 1:
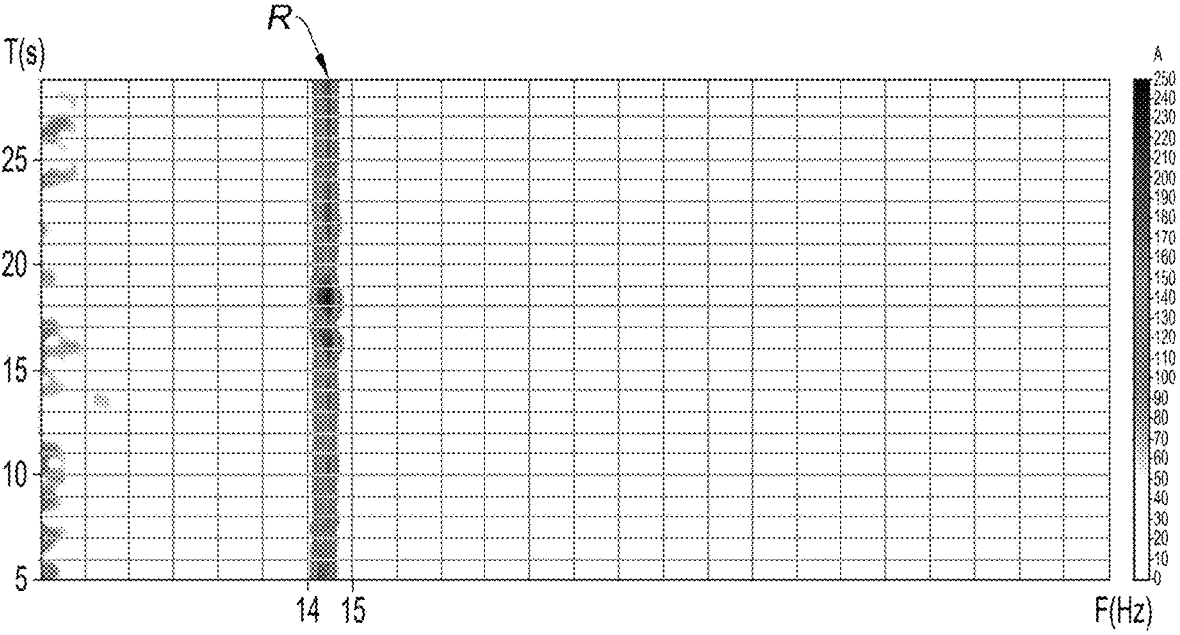
FIG. 1 is a diagram representing the time as a function of a frequency of an oscillation of the steering wheel on which is illustrated an amplitude of the oscillation of the steering wheel, on a vehicle equipped with an imbalance carrying out a movement at approximately 110 km/h.
Figure 2:
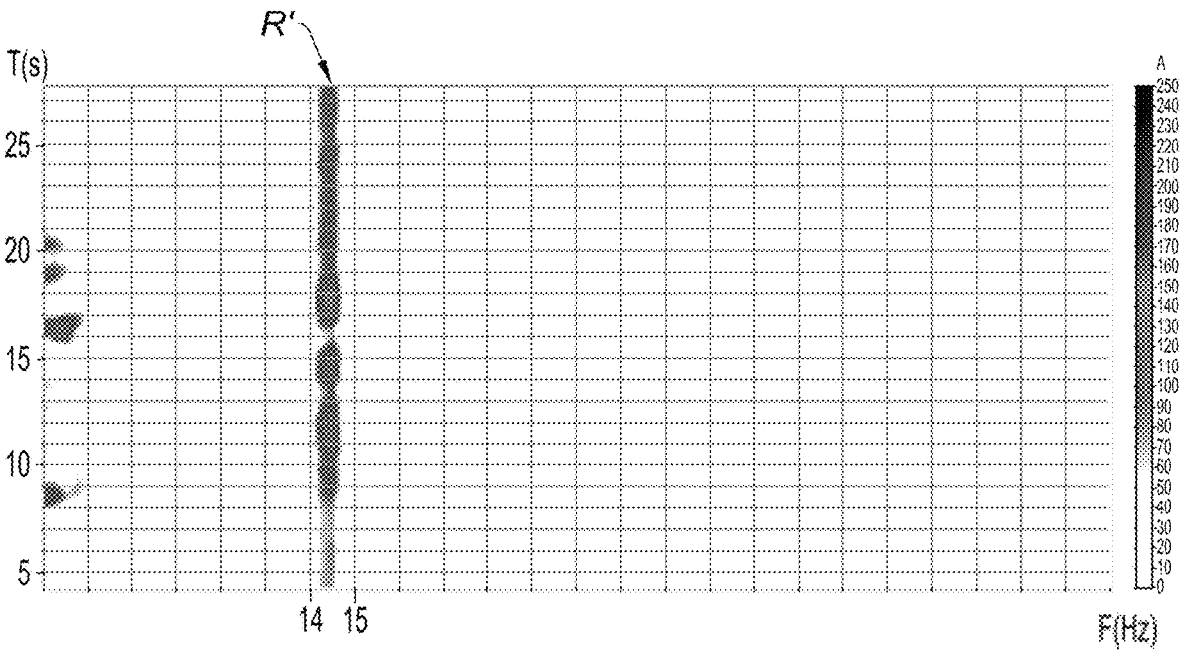
FIG. 2 is a diagram representing the time as a function of a frequency of an oscillation of the steering wheel on which is illustrated an amplitude of the oscillation of the steering wheel, on the vehicle of FIG. 1, said vehicle comprising a solution of the related art to decrease the amplitude of the steering wheel oscillation.
Figure 5:
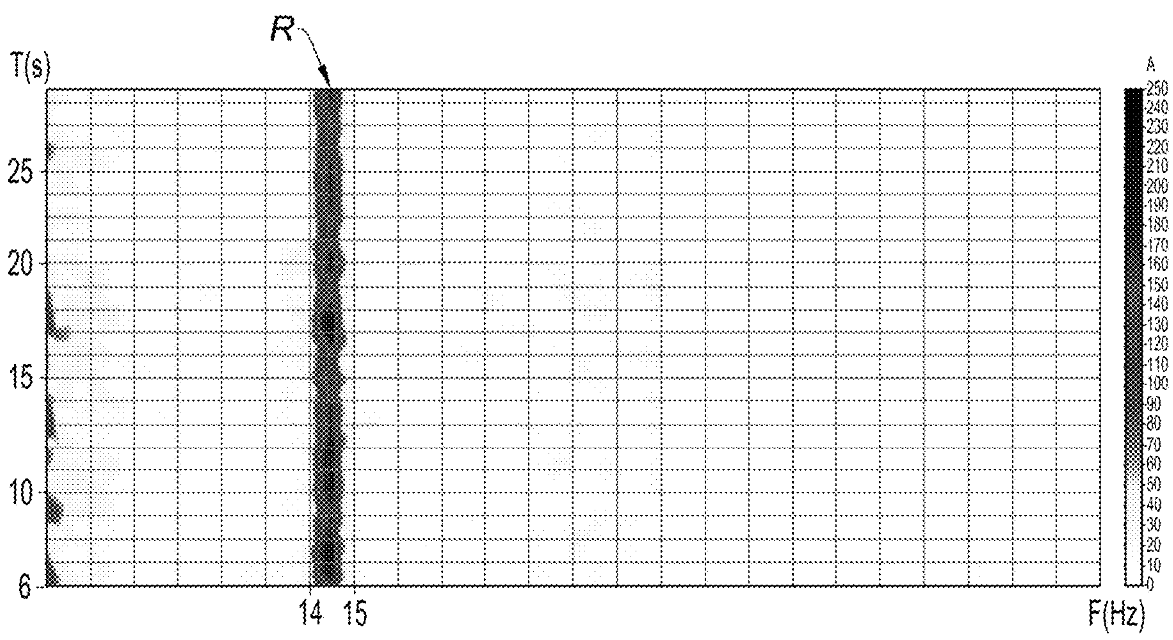
FIG. 5 is a diagram representing the time as a function of a frequency of an oscillation of the steering wheel on which is illustrated an amplitude of the oscillation of the steering wheel, on a vehicle equipped with an imbalance carrying out a movement at approximately 110 km/h.

FIG. 5 represents the results in the form of a graph of a test carried out on a vehicle 2 exhibiting an imbalance and moving at about 110 km/h, when the vehicle 2 does not comprise a method 10 according to the invention. Analogously to FIG. 1, the diagram of FIG. 5 represents the time T as a function of the frequency F as well as a substantially vertical line R corresponding to a high oscillation amplitude A at 14.5 Hz.

Figure 6:
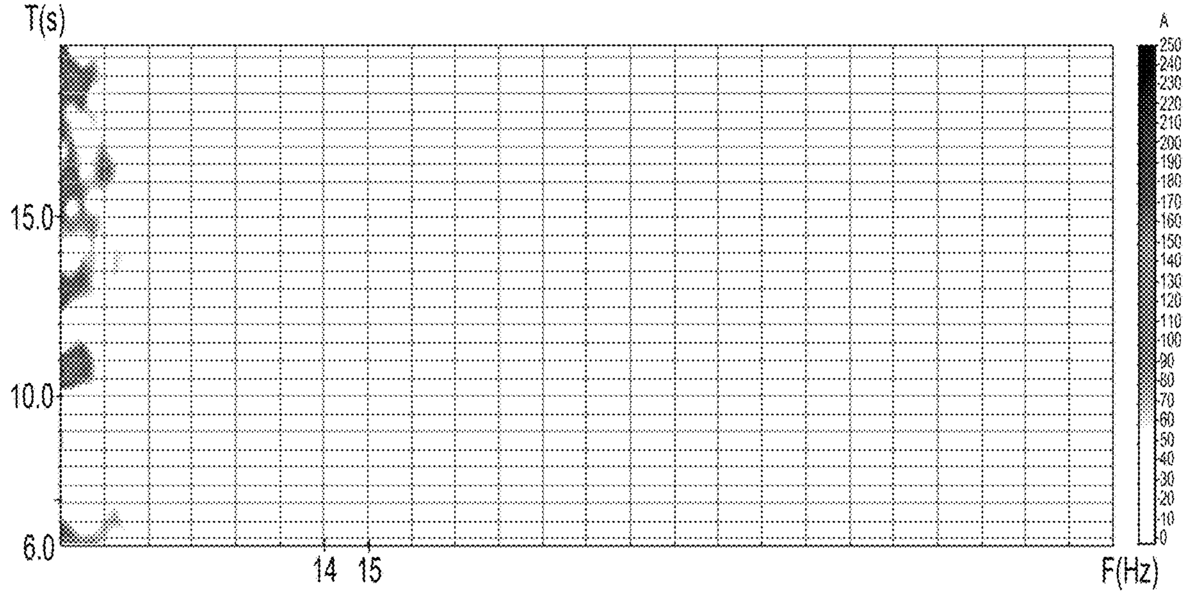
FIG. 6 is a diagram representing the time as a function of a frequency of an oscillation of the steering wheel on which is illustrated an amplitude of the oscillation of the steering wheel, on the vehicle of FIG. 5, said vehicle comprising the method according to the invention to reduce the amplitude of the steering wheel oscillation.

FIG. 6 represents the results in the form of a graph of the test carried out on the vehicle 2 of FIG. 5, when the vehicle 2 comprises a method 10 according to the invention. On the graph of FIG. 6, the high amplitude R line A visible in FIG. 5 has completely disappeared. Thus, the method 10 according to the invention therefore makes it possible to suppress any amplitude A of oscillation of the steering wheel 3 when a wheel 100, 11 has an imbalance. The driver is no longer aware that the wheel has an imbalance.

Figures 7, 8:
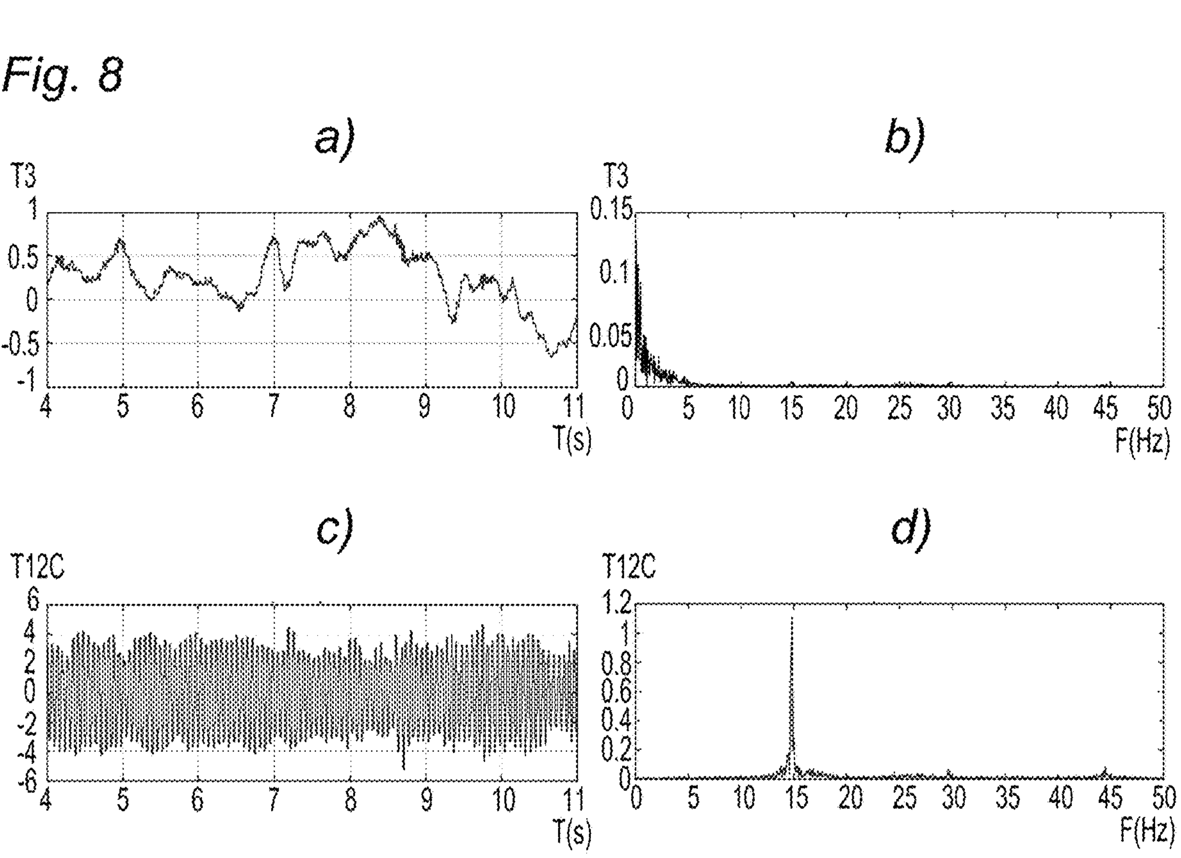
FIG. 7 is a representation of the steering wheel torque as a function of time and as a function of frequency on the vehicle of FIG. 5.
FIG. 8 is a representation of the steering wheel torque and of the compensation torque as a function of time and as a function of frequency on the vehicle of FIG. 6.

This result is confirmed in FIGS. 7 and 8.

FIG. 7*a* illustrates the steering wheel torque T3 felt by the driver during the previous test in which the method 10 according to the invention is not activated. FIG. 7*a* shows perfectly the oscillation of the steering wheel torque T3 which is perceptible to the driver. This is confirmed by a frequency analysis of the steering wheel torque T3 and which is represented in FIG. 7*b*. FIG. 7*b* shows a frequency peak at 14.5 Hz.

FIGS. 8*a* and 8*b* are similar to FIGS. 7*a* and 7*b* when the method 10 according to the invention is activated on the vehicle. The steering wheel torque T3 no longer exhibits oscillation, which is confirmed by the frequency analysis. In addition, FIG. 8*c* illustrates the compensation motor torque T12C determined by the compensation algorithm 61.

The compensation motor torque T12C has a visible oscillation. This is confirmed by the frequency analysis carried out in FIG. 8*d*.

Of course, the invention is not limited to the embodiments described and represented in the appended figures. Modifications remain possible, in particular from the point of view of the constitution of the various elements or by substitution of technical equivalents, without thereby departing from the scope of protection of the invention.

The invention claimed is:

1. A method for controlling an assistance motor of a power steering system, said power steering system comprising at least one steering wheel configured to receive a steering wheel torque applied by a driver, the assistance motor configured to apply a motor torque to a rack, at least one wheel connected to said rack, and at least one steering computer, the method comprising:

executing, by the at least one steering computer, a main control algorithm, the main control algorithm comprising a step of determining a main motor torque as a function of at least the steering wheel torque; and executing, by the at least one steering computer, a compensation algorithm that compensates for an oscillation of the steering wheel induced by an imbalance present on at least one of the at least one wheel, the compensation algorithm comprising a step of determining a compensation motor torque such that the steering wheel torque becomes equal to a reference steering wheel torque, the reference steering wheel torque having a fixed value, wherein the step of determining the compensation motor torque comprises a phase of calculating a steering wheel torque error by determining a difference between the steering wheel torque and the reference steering wheel torque and a phase of filtering low frequencies by a high-pass filter, the high-pass filter having a cut-off frequency chosen to compensate said oscillation induced by said imbalance, wherein an operating frequency of the compensation algorithm is selectable independently of an operating frequency of the main control algorithm, wherein an amplitude of the oscillation of the steering wheel is directly related to a magnitude of the imbalance, the amplitude being measurable using the steering wheel torque, and wherein a frequency of the steering wheel oscillation is proportional to a vehicle speed, wherein the steering wheel applies torque to the rack at a first location of the rack, and the assistance motor applies the motor torque to the rack at a second location of the rack that is different from the first location.

2. The method according to claim 1, further comprising a summation step wherein the compensation motor torque is added to the main motor torque so as to determine the motor torque.

3. The method according to claim 1, wherein the reference steering wheel torque is equal to 0 Nm.

4. The method according to claim 1, wherein the high-pass filter has a cut-off frequency of 10 Hz.

5. The method according to claim 1, wherein the step of determining the compensation motor torque further comprises a compensation phase in which a controller determines the compensation motor torque depending on the steering wheel torque error.

6. The method according to claim 1, wherein the operating frequency of the compensation algorithm is less than 200 Hz.

7. A vehicle implementing a method according to claim 1.

* * * * *